May 2, 1933.  W. T. CHILSON  1,907,039
POULTRY FEEDER
Filed May 31, 1932
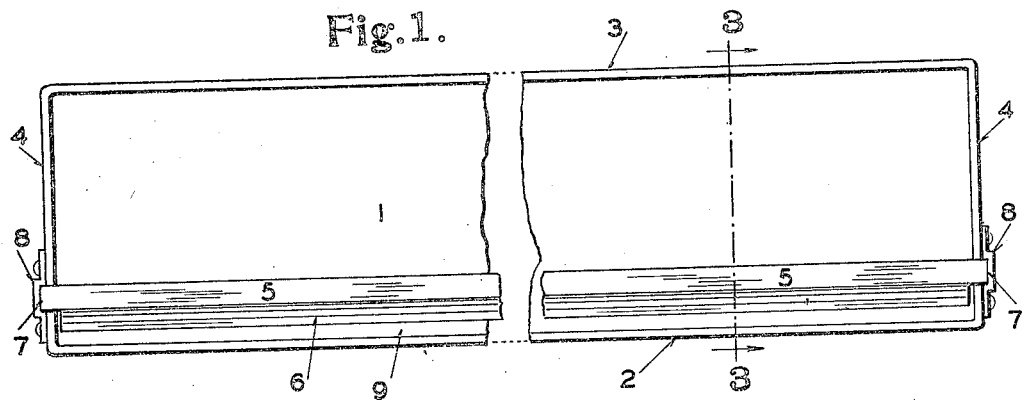
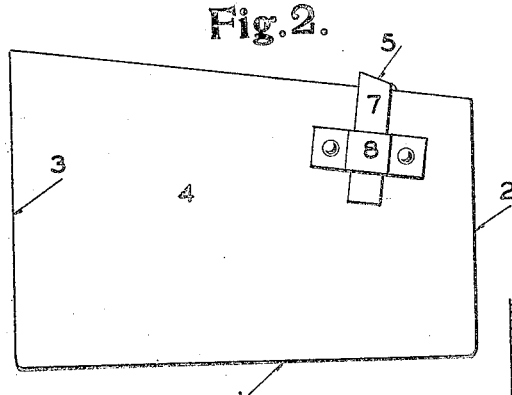
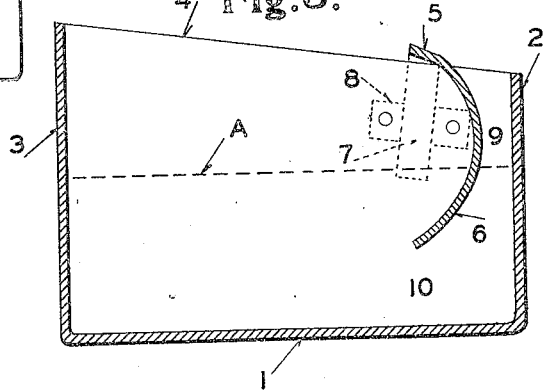
Inventor
Wm. T. Chilson
By E. E. Huffman
Att'y.

Patented May 2, 1933

1,907,039

UNITED STATES PATENT OFFICE

WILLIAM T. CHILSON, OF ST. LOUIS, MISSOURI, ASSIGNOR TO RALSTON PURINA COMPANY, OF ST. LOUIS, MISSOURI, A CORPORATION OF MISSOURI

POULTRY FEEDER

Application filed May 31, 1932. Serial No. 614,312.

My invention relates to a poultry feeder and particularly to trough feeders of the kind used to supply poultry with feed, such as grain, meal or the like either in a dry or moist condition.

The object of my invention is to produce a feeder which is not only simple in construction and readily kept in sanitary condition, but which will also wholly or largely prevent loss of feed by being displaced from the trough. Such displacement is caused by the scattering action resultant either from splashing, caused by the forcible striking of the feed by the bird's beak, or from its being shaken from the beak by tossing of the head, common during feeding.

In the accompanying drawing, which illustrates one form of feeder made in accordance with my invention, Figure 1 is a top plan view; Figure 2 is an end elevation; and Figure 3 is a cross section taken on the line 3—3 of Figure 1.

The trough may be of any desired shape and formed of any suitable material. As shown in the drawing it is rectangular in form and made of sheet metal such, for example, as galvanized iron. It consists of a bottom 1, front and rear side walls 2 and 3, respectively, and a pair of end walls 4. The guard, which is made of a single piece of sheet metal, comprises a cross bar 5 and a depending curved plate 6. The cross bar 5 extends beyond the plate 6 and has its ends bent at right angles to its main part to form supporting standards 7 engaging with sockets 8 on the end walls 4. The sockets are so positioned as to space the plate from the wall 2 to form a restricted passage 9. This passage is of such width as to allow free passage of the feed but to prevent the entrance of the fowl's head. Due to the shape of the guard, the most constricted part of the passage 9, which is considerably below the top of the trough, may be made sufficiently narrow to prevent the entrance of the fowl's head while the forward edge of the bar 5 is placed far enough back to prevent scattered feed from passing over the front wall 2. The cross bar 5, together with the upper part of the plate 6, provides an inclined surface for deflecting such of the scattered feed as passes over the bar into the passage 9, while that passing under the bar is intercepted by the concave face of the guard. As the lower part of the passage is flared downwardly, the feed passing through it is prevented from clogging in the narrow part. The lower edge of the plate is preferably spaced from the bottom of the trough to provide a communicating way 10 between the body of the trough and the restricted passage 9.

In using my feeder it may be suspended or otherwise supported with its rear wall against a suitable barrier, such as the wall of a poultry house, so that it may be approached only from the front. The trough is only partially filled with feed, for example, to the height indicated by the broken line A (Figure 3) so that the feed in the passage 9 cannot be reached by the feeding fowls. It will be understood, however, that if the feed is of such nature that it does not tend to flow, the body of the trough may be filled to a higher level without unduly raising the level in the passage 9. All, or nearly all of the feed scattered by the fowls when feeding, will either fall back into the body of the trough or be deflected into the passage 9 and so retained in the forward part of the trough. Excess feed in the passage 9 will flow through the communicating way 10 into the body of the trough. The removal of the guard also permits ready and thorough cleaning of both the trough and the guard so that the feeder may easily be kept in sanitary condition.

Having fully described my invention, what I claim as new and desire to secure by Letters Patent of the United States is:

1. A poultry feeder comprising a trough, and a guard plate of curved cross section, said guard plate being positioned in said trough adjacent a wall thereof with its convex face toward said wall and forming therewith a restricted feed return passage.

2. A poultry feeder comprising a trough provided with a pair of sockets, and a guard; said guard including a cross bar and a depending plate, and supporting standards on the cross bar and engaging said sockets to removably position the plate adjacent a wall of the trough to form therewith a feed return passage.

3. A poultry feeder comprising a trough provided with a pair of sockets, and a guard; said guard including a cross bar and a depending curved plate, and supporting standards on the cross bar and engaging said sockets to removably position the plate adjacent a wall of the trough with its convex face toward said wall to form therewith a restricted feed return passage.

In testimony whereof, I hereunto affix my signature, this 25 day of May, 1932.

WILLIAM T. CHILSON.